May 9, 1933.                L. DOTSON                1,908,228
                         AUTOMOTIVE BRAKE
                      Filed April 30, 1931          2 Sheets-Sheet 2

INVENTOR
Leroy Dotson
BY
Toulmin & Toulmin
ATTORNEYS

Patented May 9, 1933

1,908,228

UNITED STATES PATENT OFFICE

LEROY DOTSON, OF COLUMBUS, OHIO

AUTOMOTIVE BRAKE

Application filed April 30, 1931. Serial No. 533,885.

My invention relates to an automotive brake.

It is an object of my invention to provide an automotive brake mechanism in which the brake shoes will be engaging a substantial portion of the entire drum, in which the actuation of the brake shoes will be positive and uniform with respect to one another and with respect to the braking surfaces.

It is a further object to provide a braking mechanism in which the actuating parts are very simple and in which adjustments can be made by replaceable cam roller plates without the aid of a specially trained mechanic.

It is particularly the object of my invention to reduce the ordinary complex brake operating mechanism, while at the same time providing uniform braking action, easily adjusted, and brake shoes engaging substantially all of the braking surface.

Figure 1:
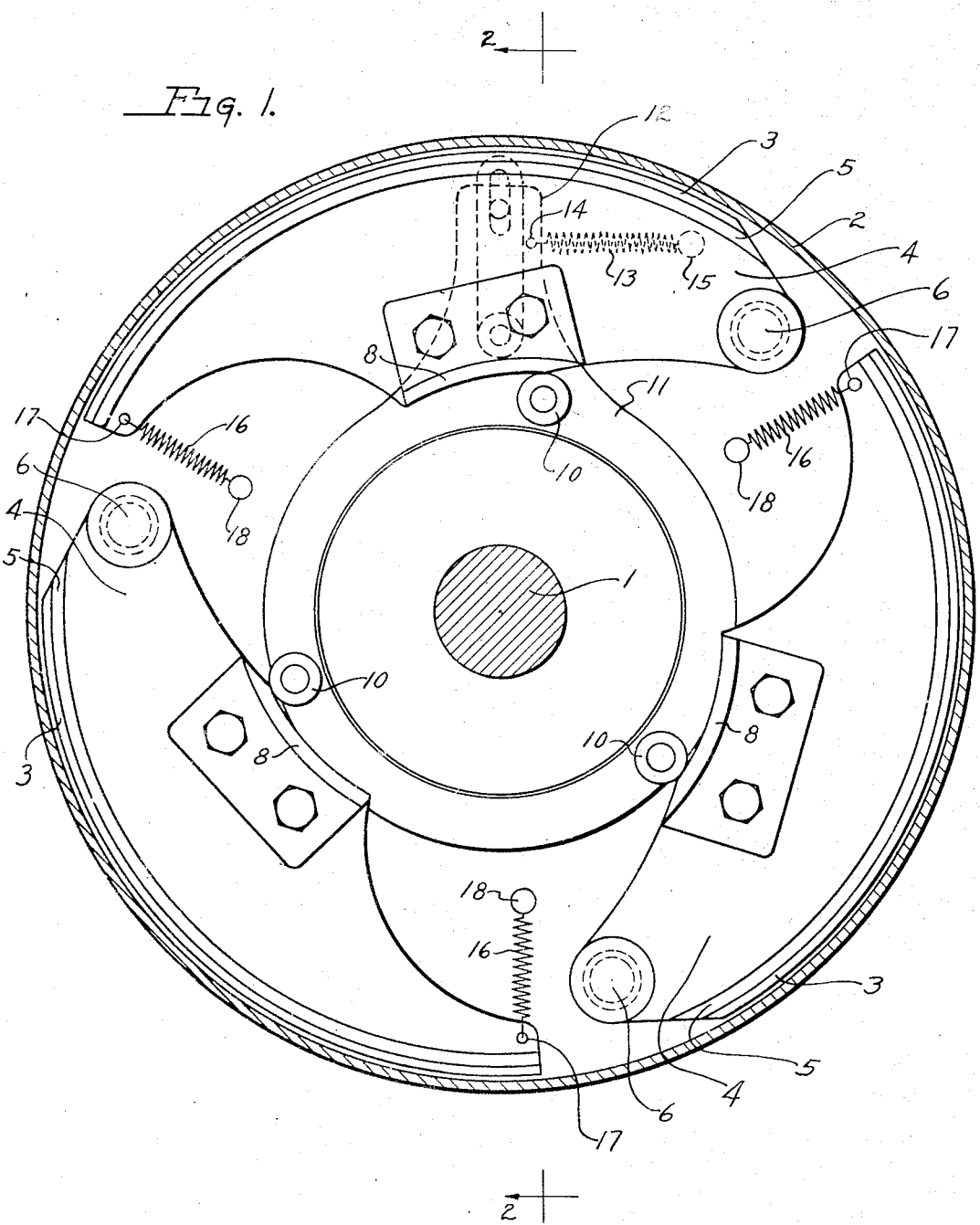

Referring to the drawings, Figure 1 is a front elevation with the axle in section of a brake drum and my braking mechanism.

Figure 2:
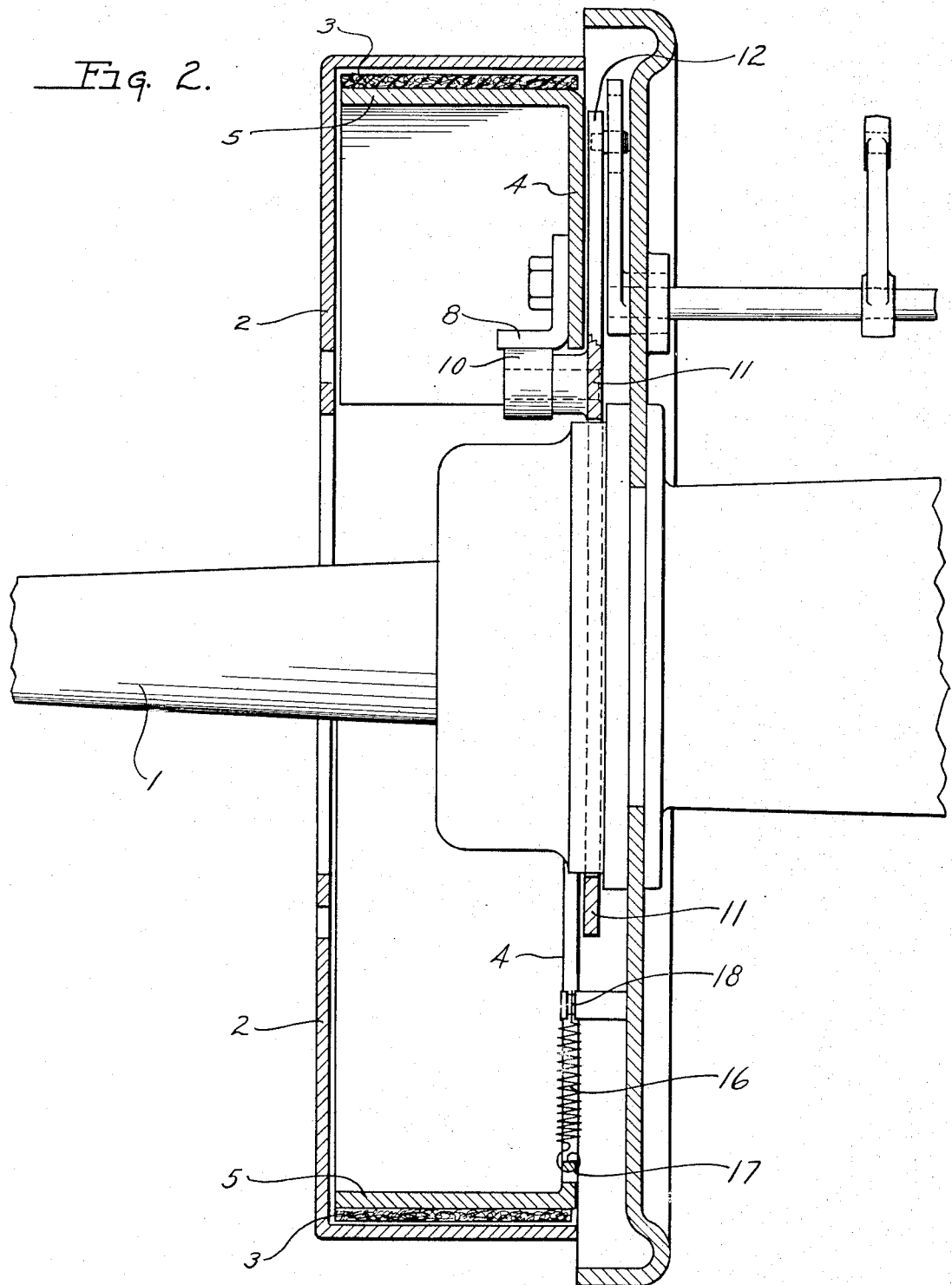

Figure 2 is a section on the line 2—2 of Figure 1.

Referring to the drawings in detail, 1 is an axle of a vehicle carrying the brake drum 2 having a brake lining 3. This lining is engaged by a plurality of shoes which may be very cheaply made of pressed metal, if desired, comprising the vertical shoe body 4 and a shoe face 5. The shoe body is pivoted at 6 to the plate 7.

Mounted on the inner side of the brake shoe body 4 is a detachable cam plate 8 engaging with the cam roller 9 which is mounted on a shaft 10 upon the ring disk or spider 11 which is rotatably mounted upon the axle 1.

This ring 11 is provided with an arm 12 that is normally yieldingly held in its inoperative position by the helical spring 13, which is attached to it at 14 and to a stationary support such as the plate 7 at 15.

The brake shoe itself is restrained normally by the helical spring 16, against centrifugal force. This spring 16 is connected to the brake shoe at 17 and plate 7 at 18.

The actuating means for the brakes, not shown for the purpose of clearness, is connected to the lever 12. By the rotation of the ring 11 with the cam rollers 9 against the cam faces 8, the brake shoes 14 have their braking faces 5 moved outwardly against the brake lining 3 to rotate the brake drum which is carried by the wheel.

It will be noted that for adjustment and repair, either the rollers 9 or the cam plates 8 may be replaced. Such an operation is a simple one by detaching the screws and nuts indicated in the drawings. Anyone without mechanical skill can perform this operation.

The brake shoes themselves may be made of cast or pressed metal so that the cost or dead weight may be very materially reduced.

The ring 11 is substantially a floating ring, there being a clearance between it and the supporting hub. This enables the wear on the brake shoes to be compensated for by the movement of this ring.

I desire to comprehend within my invention such modifications as may be embraced within my claims and the scope of my invention.

Having thus full described my invention, what I claim as new and desire to secure by Letters Patent, is:

1. In a braking mechanism, a brake drum, a plurality of inwardly disposed brake shoes, means for pivotally supporting said shoes at one end, cam faces having portions of greatest depth near the free ends of said shoes and located near the center thereof, cam actuating means mounted in floating relation centrally of the brake shoes and adjacent said cam faces and in engagement therewith, means for actuating said cams to actuate said shoes, yielding means to restrain the outward movement of said shoes until positively actuated by said cam means, and yielding means to restrain the inward movement until positively actuated by the cam means.

2. In an automotive braking mechanism, a brake drum having a flange, a plurality of shoes engaging substantially the entire area of the flange, means of pivotally mounting said shoes adjacent the ends thereof and within said liner, a floating ring pivotally mounted upon the axle, cam rollers on said ring adapted to engage cam faces on the interior of said brake shoes substantially centrally of the shoes and movable in the operation of applying the shoes toward the free ends thereof whereby said brake shoes are simultaneously operated equally, said cam faces comprising detachable cam plates.

3. In combination, a brake drum, a brake shoe pivoted thereto adjacent its rear end, an operating cam on the interior of the brake shoe located centrally thereof and a floating ring having a cam roller adapted to engage said cam and actuate said brake shoe against the brake drum progressively from adjacent the pivot end towards the free end of the brake shoe.

4. In combination, a brake drum, a brake shoe pivoted thereto adjacent its rear end, an operating cam on the interior of the brake shoe located centrally thereof, and a floating ring having a cam roller adapted to engage said cam and actuate said brake shoe against the brake drum progressively from adjacent the pivot and towards the free end of the brake shoe, said cam being arranged so that its face diverges in a curved path inwardly from the curvature of the brake shoe engaging face and the brake drum from the pivot end of the brake shoe toward its free end.

In testimony whereof, I affix my signature.

LEROY DOTSON.